July 10, 1928.
T. W. FRECH
HEADLAMP ADJUSTING CHART
Filed Nov. 5, 1925
1,677,028
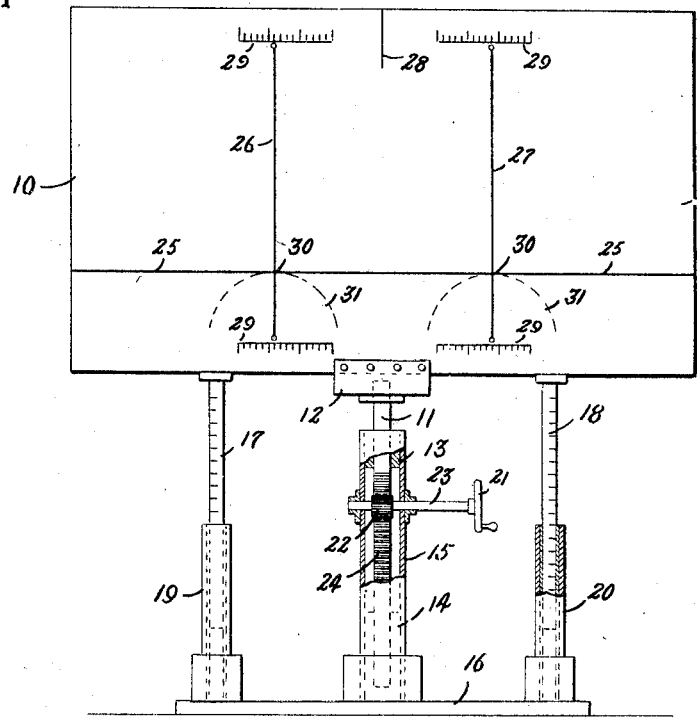
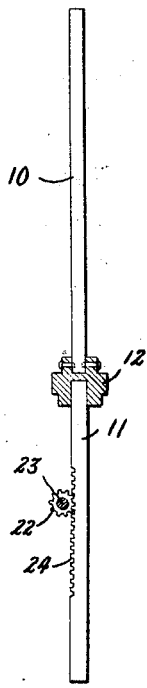
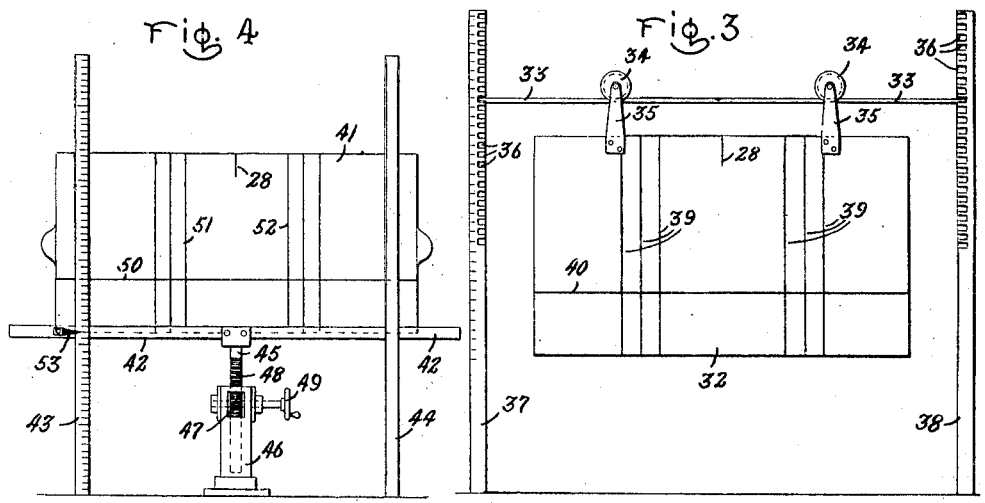
INVENTOR:
THEODORE W. FRECH.
BY
HIS ATTORNEY.

Patented July 10, 1928.

1,677,028

UNITED STATES PATENT OFFICE.

THEODORE W. FRECH, OF CLEVELAND, OHIO, ASSIGNOR TO GENERAL ELECTRIC COMPANY, A CORPORATION OF NEW YORK.

HEADLAMP-ADJUSTING CHART.

Application filed November 5, 1925. Serial No. 67,172.

My invention relates to vehicle headlight adjusting screens. In use the vehicle is positioned a definite distance from the screen, the headlamps lit, and the positions of the light spots projected on the screen indicate whether the lamps are properly focused. The object of my invention is to provide a device which will be more convenient to handle and operate than devices of that character heretofore available.

In the accompanying drawing Fig. 1 is a front elevation partially in section of the preferred form of my improved chart or screen; Fig. 2 is a side elevation partially in section showing more clearly the adjusting means therefor; Fig. 3 is a front elevation of a modification; and Fig. 4 is a front elevation of still another modification.

Referring to the drawing, and particularly Figs. 1 and 2, a screen 10 is supported in a substantially vertical direction by means of a rod 11 which carries at its upper end thereof the bracket 12 to which the said screen is fastened. The rod 11 is slidably mounted in bearings 13 and 14 carried by standard 15 which extends from a base 16. In order to insure accurate alignment of the screen 10, I provide a pair of aligning rods 17 and 18 which extend downwardly therefrom and are slidable in the holders 19 and 20 respectively carried by the base 16. The screen may be raised and lowered by means of a hand wheel 21 which operates the pinion 22 through the shaft 23, the pinion 22 meshing with rack 24 constituting part of rod 11. The screen 10 has on its face a horizontal line 25 and a pair of vertical markers 26 and 27. The height of line 25 is indicated by scales on the rods 17 and 18. The vertical markers are movable and preferably consist of a pair of elastic tapes which may be held by hooks or thumb tacks, their distances from the center line 28 of the screen being indicated by the scales 29.

The operation of my device is as follows: The automobile is first properly aligned with reference to the screen. One arrangement is to provide guides for the wheels that will automatically center the car at right angles to the center of the screen, and to provide stops that will bring the headlights a prescribed distance, which may be twenty-five feet, from the screen. The alignment may be checked by sighting through the rear window of the car over the radiator cap to the center mark 28 on the screen. The next operation is to measure the distance from the floor to the center of the headlights, and adjust the screen accordingly until the line 25 is the prescribed distance from the floor. Measure the distance between the headlight centers and set both vertical tapes 26 and 27 on the corresponding figures along the scales 29 of the screen 10. With one headlight covered, aim the beam of the other on one of the points of intersection 30, and adjust the headlight so that its spot or pattern 31 is centered, as indicated in dotted lines, with its upper boundary on the horizontal line 25. Next cover the adjusted headlight and repeat the operation on the other.

If when the car is empty, the beams are aimed to meet the requirements, loading the car fully will tilt the headlights upward into the eyes of approaching drivers. Therefore, an allowance must be made for the tilt of the headlights. The following table gives the necessary allowances as determined by tests of many hundreds of cars:

| Wheel base | Touring | Sedan | Coupe | Roadster |
|---|---|---|---|---|
| | Inches | Inches | Inches | Inches |
| 100–110 | 8 | 7 | 6 | 5 |
| 110–120 | 7 | 6 | 5 | 4 |
| 120–130 | 6 | 5 | 4 | 4 |
| 130–140 | 5 | 4 | 3 | 3 |

After the loading allowance has been determined, the screen is lowered a distance equal to the allowance, and this brings the line 25 the correct distance from the floor.

In Fig. 3 a modification is shown which comprises a horizontally and vertically adjustable screen 32 supported by means of a rod 33 through the rollers 34 and straps 35. The rod 33 is adjustably supported in slots 36 located in the uprights 37 and 38. Although vertical markers of the same character as shown in Fig. 1 may be used, a simpler expedient is to provide a series of lines 39, pairs of which are spaced equidistant from the center line, the distance between lines of the respective pairs varying according to the make of automobile. The horizontal line 40 is similar to line 25 shown in Fig. 1.

Another modification is shown in Fig. 4 which comprises a removable screen 41 supported by means of the cross piece 42 and uprights 43—44. The cross piece 42 is supported by means of a rod 45 which is slidably mounted in bearings formed in the standard 46. Raising and lowering of the cross piece 42 is accomplished by means of the pinion 47 and rack 48 through the hand-wheel 49. The horizontal marker 50 and the vertical markers 51—52 are preferably stationary. In this modification there are no aligning rods, and the upright 43 is scaled. The cross piece 42 carries an indicator 53.

The operation of the modifications shown in Figs. 3 and 4 is similar to that of Fig. 1, excepting that the screen 34 (Fig. 3) in addition to being capable of being adjusted vertically, is also capable of horizontal adjustment. The horizontal adjustment is convenient in obtaining alignment of the center line of the car and line 28. It is, of course, easier to move the screen than the car. Another advantage is that, where there are several cars lined up side by side with headlights to be adjusted, the screen may be moved along a rod 35 of suitable length from one car to the other. In Fig. 4 the screen 44 is removable so that each make of car may have its particular screen.

What I claim as new and desire to secure by Letters Patent of the United States is:—

1. A headlight adjusting apparatus comprising a screen having thereon a horizontal line, supporting means for said screen, means for vertically reciprocating said screen, and a scale for indicating its height.

2. A headlight adjusting apparatus comprising a screen having horizontal and vertical lines thereon, the latter being arranged in pairs equally spaced from a center line, supporting means for said screen, means for vertically reciprocating said screen, and a scale for indicating its height.

3. A headlight adjusting apparatus comprising a screen having thereon a horizontal line, supporting means for said screen, means comprising a rack and pinion for vertically reciprocating said screen, and a scale for indicating its height.

In witness whereof I have hereunto set my hand this 2nd day of November, 1925.

THEODORE W. FRECH.